United States Patent [19]
Edamoto et al.

[11] 4,041,508
[45] Aug. 9, 1977

[54] CAMERA INSTALLED WITH ELECTRONIC FLASH
[75] Inventors: Akio Edamoto, Kawasaki; Tooru Hayakawa, Yokohama, both of Japan
[73] Assignee: Sunpak Corporation, Tokyo, Japan
[21] Appl. No.: 661,382
[22] Filed: Feb. 25, 1976
[51] Int. Cl.² ............................................ G03B 17/18
[52] U.S. Cl. .................................. 354/128; 354/273; 354/289
[58] Field of Search .............. 354/145, 149, 126, 127, 354/128, 289, 273, 149

[56] References Cited
U.S. PATENT DOCUMENTS
3,443,498  5/1969  Bihlmaier ............................ 354/128
3,906,526  9/1975  Toyoshima et al. ............. 354/273 X FOREIGN PATENT DOCUMENTS
1,196,604  2/1970  United Kingdom ................ 354/149
1,196,605  2/1970  United Kingdom ................ 354/127

Primary Examiner—Edna M. O'Connor
Attorney, Agent, or Firm—Burgess, Ryan and Wayne

[57] ABSTRACT

This invention provides a camera of a simple structure installed with an electronic flash. The shutter speed is fixed and the opening of an iris diaphragm alone is variable. Values of the iris diaphragm opening are indicated by pictures so that an appropriate value can easily be selected. Pictures include two kinds, namely pictures of weather marks indicating the weather condition and pictures of distance marks indicating the distance to an object to be photographed. These picture marks are interchanged by "on" and "off" operations of a switch of a power source of the installed electronic flash. More specifically, when the switch is put off, weather marks alone can be seen, and when the switch is put on, distance marks alone can be seen.

9 Claims, 4 Drawing Figures

CAMERA INSTALLED WITH ELECTRONIC FLASH

BACKGROUND OF THE INVENTION

This invention relates to a handy camera suitable for photographing by amateurs. More particularly, the invention relates to a cheap camera installed with an electronic flash for obtaining flashes by utilizing discharge of a discharge tube.

In order to spread cameras, it is necessary to provide cheap cameras which can easily be operated night and day.

Cameras which can be operated very easily and can provide photographs of an appropriate quantity of exposure merely by pushing shutter buttons in the case of day photographing have already been developed. However, at night or in the dark place an artificial light source should be employed for photographing. When an artificial light source is employed, a photograph of an appropriate quantity of exposure cannot be obtained only by pushing a shutter button, but an appropriate value of the iris opening should be chosen depending on the distance to an object to be photographed. Selection of an appropriate value of the iris opening is very troublesome and difficult to amateurs. Further, it is necessary to carry in hands an artificial light source as well as a camera. Accordingly, amateurs seldom conduct photographing at night. Furthermore, amateurs often do not carry artificial light sources because of such troubles, and they often are unable to take photographs in the evening or under such conditions that it seems relatively light but actually considerably dark. If photographing is daringly conducted in such case, good photographs can hardly be obtained.

Accordingly, development of cameras which will make it possible to conduct photographing easily even at night has been eagerly desired in the art. The portability will be improved by installing in a camera an artificial light source, especially an electronic flash for obtaining flashes by utilizing discharge of a discharge tube. In fact, several kinds of cameras installed with electronic flashes have been proposed. All of these cameras are still insufficient in the portability because of a large size or special shape. Each of these cameras, however, is advantageous in that an electronic flash can be used any time it is desired. Some of them are very expensive because contrivances are made to improve the operability, and their sizes are large and their shapes are not suitable for carrying. On the other hands, in cheap cameras installed with electronic flashes, photographing conditions are very limitative, and they are not preferred from the practical viewpoint. In a typical instance of cheap cameras of this type, both the shutter speed and the iris opening value are set, and even by such simple camera, sufficient photographs can be obtained because the quality of films has recently been highly improved. Accordingly, such cameras are broadly used because of the low price and simple operation. However, in these cameras both the shutter speed and the iris opening value are set, and therefore, photographing conditions are much limited and these cameras leave much to be improved. If only the iris opening value be made variable, limitations on the photographing conditions will be substantially removed. However, it is one of difficult problems for amateurs how to select an appropriate value of the iris opening. Further, in cameras installed with electronic flashes, the standard for selection of appropriate values of the iris opening at the time of using an electronic flash is quite different from the selection standard for photographing in the day-light. Therefore, confusion arises in selecting appropriate values of the iris opening.

BRIEF SUMMARY OF THE INVENTION

It is therefore a primary object of this invention to provide a cheap camera in which the foregoing defects involved in conventional cameras are overcome.

Another object of this invention is to provide a cheap camera which can be operated and carried very easily and which can provide beautiful photographs night and day.

Still another object of this invention is to provide a cheap camera installed with an electronic flash which is handy to carry.

A further object of this invention is to provide an electronic flash-installed camera in which photographing can be accomplished merely by changing the value of the iris opening regardless of whether or not the installed electronic flash is used.

A still further object of this invention is to provide an electronic flash-installed camera in which an appropriate value of the iris opening can easily be selected regardless of whether or not the installed electronic flash is used.

Figures indicating the iris opening values are incomprehensible to amateurs. It is not absolutely necessary to indicate the iris opening values by such figures. Especially when the shutter speed is fixed, an appropriate value of the iris opening is naturally set depending on the brightness of an object to be photographed, and hence, the iris opening values can be indicated by pictures showing the weather condition. Amateurs can select appropriate values if they are indicated by pictures. When an electronic flash is used, if the iris opening values are indicated by pictures showing the distance to an object to be photographed, an optional value can easily be selected even by amateurs. Thus, in the case of an electronic flash-installed camera, two kinds of pictures showing the weather condition and the distance are necessary. If these two kinds of pictures are given together in combination unnecessary confusion is caused, and hence, some or other contrivance should be made to avoid such confusion. In this invention, a switch for putting on or off a power source of the installed electronic flash is utilized so that only pictures showing the distance can be seen in the "on" state and only pictures indicating the weather condition can be seen in the "off" state.

Accordingly, when the electronic flash-installed camera of this invention is used for photographing in the bright place in the daytime, if only the power source of the electronic flash is put off, since only pictures indicating the weather condition can be seen, an appropriate value of the iris opening can easily be selected only by selecting a picture indicating a weather condition in agreement with the actual weather. When the electronic flash is used, if the switch is put on, pictures indicating the weather condition disappear but pictures indicating the distance to an object to be photographed, for example, a half-figure of one man, a gathered figure of three men and the like, are caused to appear instead. Therefore, an appropriate value of the iris opening can easily be selected depending on an image of an object seen through the finder.

In conclusion, according to the present invention, photographs of an appropriate quantity of exposure can always be obtained very easily without any trouble or difficulty regardless of the photographing time, namely whether photographing is conducted in the daytime or at night.

DETAILED DESCRIPTION OF THE PREFERRED EMBODIMENTS

Figure 1:
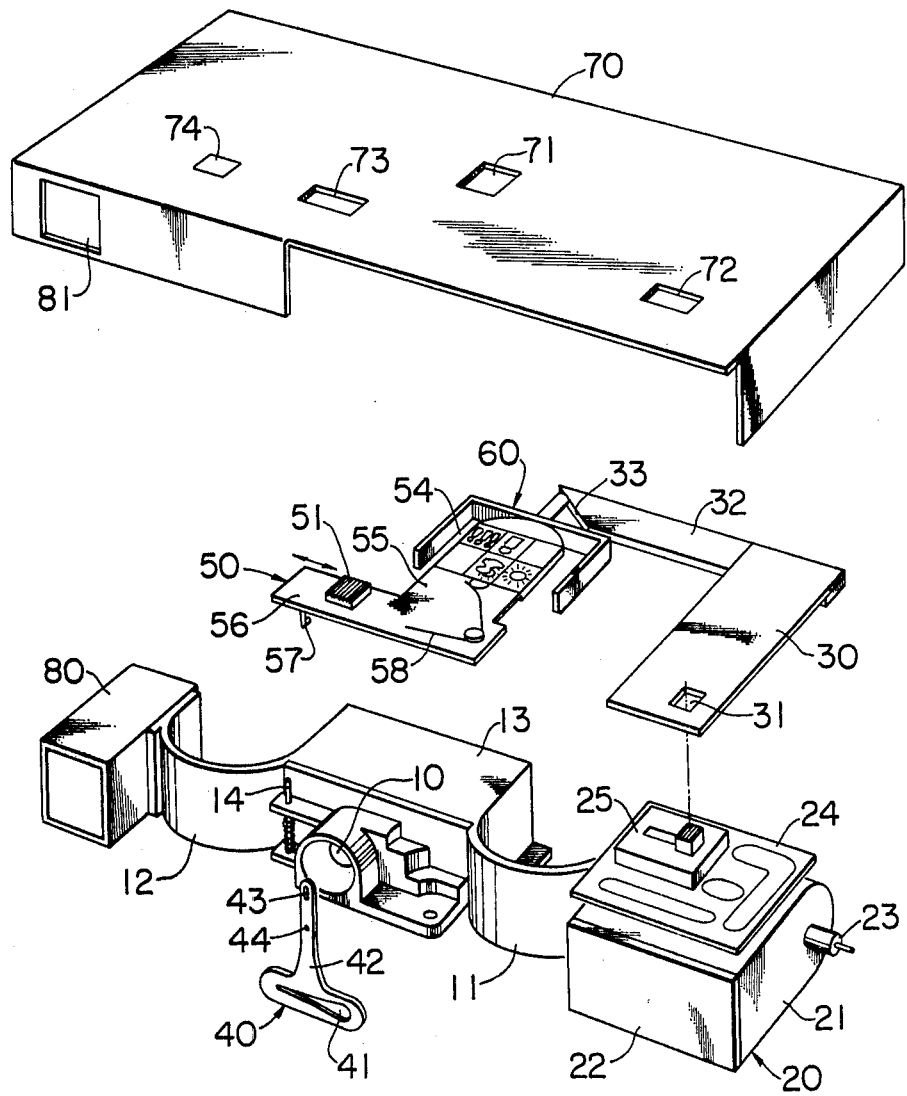
FIG. 1 is a perspective view showing one embodiment of the camera of the present invention in the disassembled state.

A photographing lens 10 is attached to a casing 13 having on both sides thereof film magazines 11 and 12 for storing a cartridged film. A shutter lever 14 is disposed so that by pushing the lever 14 a shutter vane mounted in the lens 10 is opened to close the lens 10. As the lens 10 there is employed one having a brightness corresponding to FIG. 4. A small electronic flash 20 to be installed is of about GN 14 (ASA 100 used; indicated according to the metric system), and a flashing window 22 disposed in the open part of a reflection mirror 21 is arranged in parallel to the lens 10. A discharge tube 23 is disposed on the bottom of the reflection mirror 21, and a flash from this discharge tube 23 is reflected by the reflection mirror 21 and is directly radiated through the flashing window 22 together with light. Electric parts of the electronic flash 20 are attached to a printed plate 24, and a switch 25 acting as a power switch for putting on and off the electric source of the electronic flash 20 is also attached to this printed plate 24. This switch 25 is constructed so that the switching operation can be performed by sliding a dial 26. A switch board 30 is attached to this dial 26 through a hole 31 so that the switch board 30 can be moved co-operatively with the movement of the dial 26. A change-over lever 32 is attached to this switch board 30, and an inclined face 33 is formed on the top end of the change-over lever 32. An indication change-over device for changing pictures indicating the iris opening value, which will be detailed hereinafter, is constructed by this changeover lever 32 and switch board 30. An iris member 40 having an iris hole 41 is disposed in front of the lens 10 to control the iris opening value thereof. The iris member 40 further includes a lever 42 above the part where the iris hole 41 is perforated. A hole 43 is perforated at the top end of the lever 42, and the iris member 40 is rotatably attached by a pin 44 below said hole 43.

A moving device 50 is mounted so that it can be moved horizontally in the direction indicated by an arrow by a dial 51 as shown in the drawings. This moving device 50 comprises an indicating board supporting portion 55 to which an indicating board 54 having drawn thereon whether marks 52 indicating the weather conditions by pictures and distance marks 53 indicating the distances to objects by pictures is slidably attached, and an iris opening portion 56 mounted in the direction rectangular to said supporting portion 55. A pin 57 is disposed on said iris opening changing portion 56 so that it is inserted into the hole 43 of the iris member 40 and the iris member 40 is rotated with the pin 44 being as the center with movement of the moving member 50 to change the iris opening value of the lens 10 by the iris hole 41. Weather marks 52 and distance marks 53 are formed in two stages, respectively, on the indicating board 54 attached slidably to the indicating board supporting portion 55 of the moving device 50. The weather marks 52 include a picture of shining sun, namely a mark 52a indicating fine weather, and a picture of cloud-covered sun, namely a mark 52b indicating cloudy weather. The distance marks 53 include a near distance mark 53a which is a half image of one man and a far distance mark 53b which is a gathered image of three men. The near distance mark 53a and cloudy weather mark 52b are placed in parallel, and the far distance mark 53b is placed adjacently to the near distance mark 53a on the side opposite to the fine weather mark 52a. This indicating board 54 is always pressed by a spring 58 in the direction separating from the supporting portion 55 outwardly. A guide member 60 is fitted through a buffer member 59 to the indicating board 54 on the side opposite to the side to which the spring 58 is attached, whereby the indicating board 54 is prevented from separating from the moving device. The guide member 60 has on both the band-like ends arms 61 and 62 extending in the direction rectangular thereto. The guide member 60 further includes a projection 63 extending in the direction opposite to the extending direction of the arms 61 and 62. This guide member 60 is mounted to move the indicating board 54 along the supporting portion 55 in the direction of arms 61 and 62 through the buffer member 59. The top end of the projection 63 is formed into a semicircular shape, and it is contacted with the inclined face 33 of the change-over lever 32 constituting said indication change-over device. Accordingly, when the dial 26 of the switch 25 is moved upwardly to the left in the drawings to put on the power source of the electronic flash, the change-over lever 32 is similarly moved to the left through the switch board 30 and its inclined face 33 presses the projection 63 of the guide member 60, whereby the indicating board 54 is moved against the spring 58 as pointed out hereinbefore. When the dial 26 of the switch 25 is moved to put off the power source of the electronic flash, the indicating board 54 is returned to the position shown in the drawings by a tension of the spring 58. By this movement of the dial 26 of the switch 25 the indicating board 54 is moved until the distance mark 53 is shifted to the position of the weather mark 52. On an outer casing 70, there are formed an iris opening indicating window 71 having a size sufficient to see one of weather and distance marks 52 and 53 through said window, a hole 72 into which the dial 26 of the switch 25 is inserted and an iris opening adjusting hole 73 into which the dial 51 of the moving device 50 is inserted. When a shutter button 74 is depressed, it presses the shutter lever 14 to actuate the shutter of the lens 10. A finder 80 is fitted to the outer casing 70 through an attachment hole 81 perforated on the outer casing 70.

When the power source of the electronic flash 20 is put off while the moving device 50 and the switch 25 are located at positions indicated in the drawings, the indicating board 54 is pressed inwardly by the spring 58 and only the cloudy weather mark 52b of the weather marks 52 can be seen in this state. At this time, the iris member 40 having the pin 57 inserted into the hole 43 is positioned so that the center of the iris hole 41 is set substantially in front of the lens 10 to obtain an iris opening value F : 8.

Since the shutter speed is fixed to 1/125 second, a photograph of an appropriate quantity of exposure can be obtained by depressing the shutter button 74 in this state if it is cloudy. When it is fine, the dial 51 is moved upwardly to the left within the iris adjusting hole 73 and thus, the fine weather mark 52a can be seen. By the leftward movement of the pin 57 the iris member 40 is turned with the pin 44 being as the center and the smallest portion of the iris hole 41 is located in front of the lens 10 to obtain an iris opening value F : 16. In other words, when it is fine, only by moving the dial 51 so that the fine weather mark 51a can be seen, photographing can be accomplished at an iris opening value F : 16 and a shutter speed of 1/125 second and a photograph of an appropriate quantity of exposure can be obtained. When the dial 51 is moved to the most right position, the iris member 40 is turned in the opposite direction, namely in the clockwise direction, and the lens 10 is completely opened to obtain an iris opening value F : 4. At this point, since no mark is drawn next to the cloudy mark 52b of the weather marks 52 on the left side, no mark can be seen from the iris opening indicating window 71. This means that since it is too dark, photographing cannot be performed. In other words, it is meant that the installed electronic flash 20 should be used. In this case, the dial 26 of the switch 25 is moved to put on the power source of the electronic flash 20. At this point, both the switch board 30 and the changeover lever 32 are similarly moved in the above-mentioned manner, whereby the projection 63 of the guide member 60 is pressed by the inclined face 33 of the changeover lever 32. Accordingly, the indicating board 54 is moved so that distance marks 53 can be seen instead of weather marks 52 through the iris opening indicating window 71. In short, marks seen from the window 71 can be changed over by putting on and off the power switch of the electronic flash. When no weather mark 52 is seen through the window 71, namely when the iris opening value is F : 4, if the dial 26 is moved in the above-mentioned manner, the far distance mark 53b is seen through the window 71. When the state of an object seen through the finder 80 is in agreement with the state of the mark 53b, the shutter button 74 is depressed and a photograph of an appropriate quantity of exposure can be obtained by using the electronic flash 20. If the size of the object seen through the finder 80 is larger than the picture of the mark 53b, the dial 51 of the moving member 50 is moved to the left so that the near distance mark 53a can be seen through the iris opening indicating window 71, and a photograph of an appropriate quantity of exposure can be taken by using the electronic flash 20. In other words, when the near distance mark 53a is seen from the window 71, the iris opening value is adjusted to F : 8, and since the GN value of the electronic flash is 14, an appropriate iris opening can be obtained with respect to an object distant by 1.3 to 2.5 m. When the far distance mark 53b is seen from the window 71, an appropriate iris opening is obtained with respect to an object distant by 2.5 to 5 m.

As is apparent from the foregoing illustration, since an electronic flash 20 is installed in the camera of the present invention, the camera is handy to carry. Further, if the switch 25 of the electronic flash 20 is put off in the daytime, since weather marks 52 can be seen through the iris opening indicating window 71, an appropriate iris opening can be obtained only by selecting the fine weather mark 52a or the cloudy weather mark 52b depending on the weather condition at the time of photographing. When photographing is conducted at night or in the dark, if the switch 25 is put on, the weather marks 52 disappear and distance marks 53 can be seen from the window 71 instead. Accordingly, an appropriate iris opening can be obtained only by selecting the near distance mark 53a or the far distance mark 53b depending on the size of an object seen through the finder 80. Therefore, when the camera of the present invention is employed, photographing can be performed at an appropriate F value very easily night and day.

Figure 2:
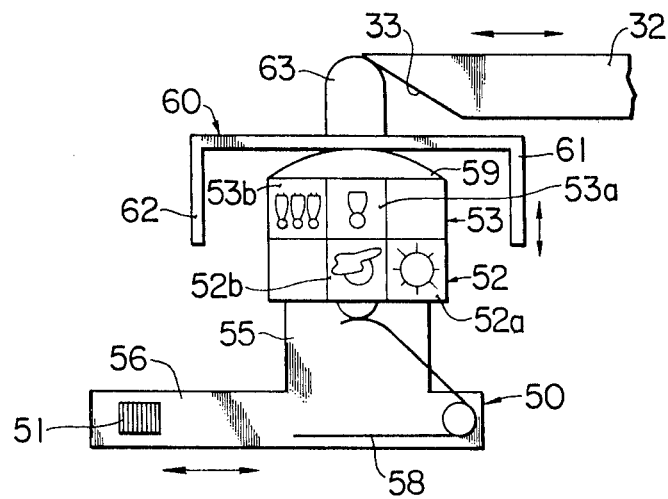
FIG. 2 is a plan view showing only the moving device of the embodiment of FIG. 1, where other elements are not shown.
Figure 3:
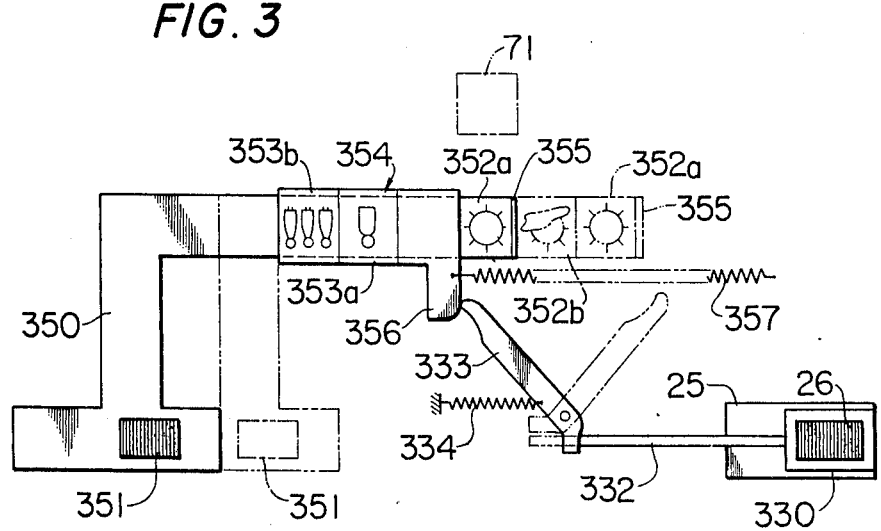
FIG. 3 is a plan view showing the moving device of another embodiment, where other elements are not shown.

FIG. 3 illustrates another embodiment of the present invention where the method of indicating marks through the iris opening indicating window 71 is modified. In FIG. 3, referential numerals 25 and 26 denote a switch and its dial, respectively, as in FIG. 1. A switch board 330 in FIG. 3 corresponds to the switch board 30 in FIG. 1, and it is moved together with the dial 26. A change-over lever 332 is attached to this switch board 330, and the top end of the lever 332 is fitted to the end of a stop lever 333 described below. A moving device 350 has a dial 351 inserted in the iris opening adjusting hole 73 of the outer casing 71 to move the entire assembly. As in the embodiment shown in FIG. 2, weather marks 352 including a fine weather mark 352a and a cloudy weather mark 352b are drawn on the top end of the portion formed in parallel to the portion on which the dial 351 is mounted. The moving device 350 is moved within a range defined by a solid line and a one-dot line in the drawings. An indicating board 354 is slidably mounted on said portion of the moving device 350 where weather marks 353 are drawn, and on this indicating board 354, there are drawn a near distance mark 353a and a far distance mark 353b with one blank area being formed from the top end of the board 354. A stopper 355 is mounted on the top end of said portion of the moving device 350 where the indicating board 354 is formed, so that the indicating board 354 is not separated from the moving device 350. A projection 356 is formed on the indicating board 356, and a spring 357 is disposed at this projection 356 so that it exerts a tensile force in the direction pressing the board 354 to the stopper 355. Further, the top end of the stop lever 333 is caused to hit on the projection 356 so that the positional relation shown in the drawings is maintained regardless of the tension of the spring until the top end of the stop lever 333 is disconnected from the projection 356.

The top end of the stop lever 333 is always pressed to the projection 356 of the indicating board 354 by means of the spring 334, and only when the dial 26 of the switch 25 is turned in the direction putting on the switch 25, the indicating board 354 is set free and is caused to hit on the stopper 355 by means of the spring 357. Although other elements are not shown in FIG. 3, by the movement of the moving device 350 the iris opening value can be changed and adjusted as in the embodiment shown in FIG. 1.

In the embodiment shown in FIG. 3, when the switch 25 is kept in the "off" state, since the indicating board 354 is stopped by the stop lever 333 as shown in the drawings, the board 354 cannot be moved by movement of the moving device 350 by the operation of the dial 351, but only weather marks 352 below the iris opening indicating window 71 are moved and the fine weather mark 352a or the cloudy weather mark 352b is seen. When the switch 25 is put on, the stop lever 333 is disconnected from the projection 356 of the indicating board 354. Accordingly, the indicating board 354 is pulled by the tensile force of the spring 357, and it is stopped when it hits on the stopper 355 of the moving device 350. Thus, the weather marks 352 on the moving device 350 are covered by the indicating board 354 and cannot be seen any more, but the near distance mark 353a or far distance mark 353b drawn on the indicating board 354 can be seen instead through the iris opening indicating window 71. In short, in the embodiment shown in FIG. 3, the change-over lever 332 and the stop lever 333 constitutes the change-over device. Since this indicating board 354 is moved with movement of the moving device 350 by the stopper 355 and spring 357, the marks seen from the iris opening indicating window 71 can be kept in a co-operative relation to the iris opening value as in the embodiment shown in FIGS. 1 and 2. More specifically, in the embodiment shown in FIG. 3, as in the embodiment shown in FIGS. 1 and 2, an appropriate iris opening value can easily be obtained only by selecting a mark of a picture corresponding to the photographing condition through the window 71 whether the electronic flash is used or not. Thus, a photograph of an appropriate quantity of exposure can easily be obtained day and night.

Figure 4:
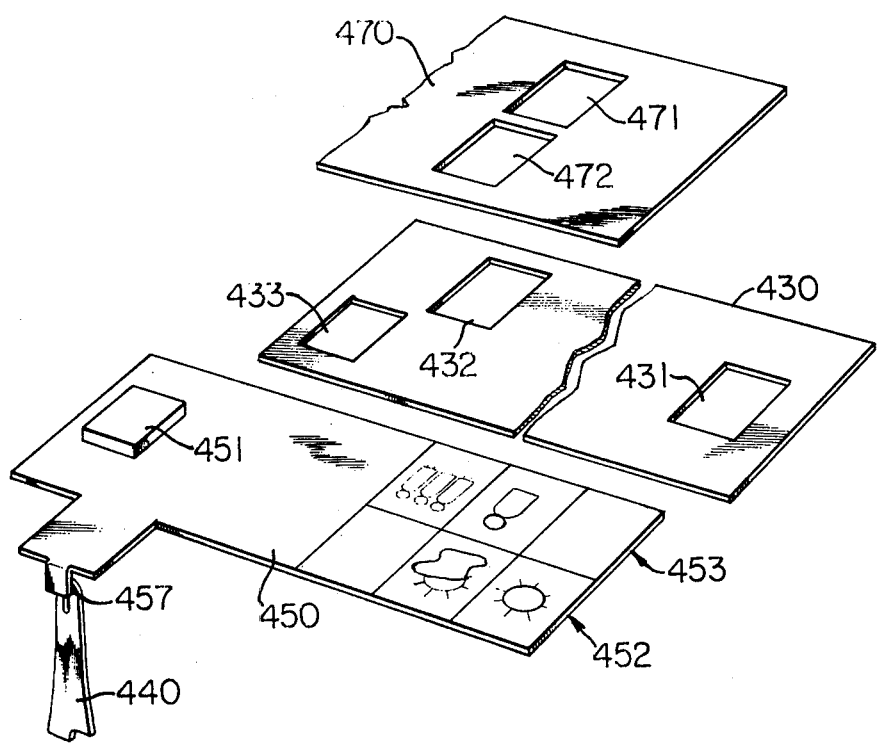
FIG. 4 is a perspective view showing the disassembled state of means for indicating respective marks through an iris opening indicating window in still another embodiment of the present invention.

In FIG. 4 illustrating still another embodiment of the present invention, two iris opening indicating windows 471 and 472 are formed in parallel on an outer casing 470. In this embodiment, an arrangement is made so that when the switch 25 is put on or off, one of the iris opening indicating windows 471 and 472 is covered. For this purpose, a switch board 430 having a hole 431 for insertion of the dial 26 of the switch 25, which is similar to the switch board 30 of the embodiment shown in FIG. 1, is formed to have a length sufficient to extend to the positions of the iris opening indicating windows 471 and 472, and moving windows 432 and 433 having the same size as that of the indicating windows 471 and 472 are formed on the switch board 430 in an oblique arrangement so that when the switch 25 is put on, the moving window 432 is quite in agreement with the iris opening indicating window 471 and when the switch 25 is put off, the moving window 433 is quite in agreement with the iris opening indicating window 472. A moving device 450 is movably mounted below the switch board 430. The same weather marks 452 and distance marks 453 as those drawn on the indicating board 54 in the embodiment shown in FIG. 1 are directly drawn on the portion of the moving device 450 where the iris opening indicating windows 471 and 472 are located. As in the embodiments shown in FIGS. 1, 2 and 3, a dial 451 is inserted into the iris opening adjusting hole 73 to move the entire assembly, and the moving device 450 has a pin 457 for attaching an iris member 440 as in the embodiment shown in FIG. 1.

In this embodiment, two iris opening indicating windows are formed; and one of them is covered by the switch board 430 so that when the switch 25 is put on, the distance marks 453 can be seen through one iris opening indicating window 453 and when the switch 25 is put off, the weather marks 452 can be seen through the other iris opening indicating window 472. Accordingly, the same effects as attained in the foregoing two embodiments can also be similarly attained in this embodiment.

In the embodiment shown in FIG. 4, two iris opening indicating windows 471 and 472 need not be formed separately from each other as shown in the drawings, but they may be replaced by one rectangular iris opening indicating window having no partition.

As detailed hereinbefore, in the present invention, since the shutter speed is fixed and only the iris opening is varied, it is made possible to indicate iris opening values not be figures but by pictures. Further, different indication systems are adopted for photographing in the daytime under sun light and for photographing using the installed electronic flash, and weather marks and distance marks can be changed over by putting on or off the power switch to indicate only one mark. Therefore, a user can select an appropriate iris opening value very easily without confusion. Further, the structure of the camera per se is substantially the same as that of a simplest box type camera. Therefore, the camera of the present invention can be provided at a very low cost. Moreover, since the iris opening value can be varied, an electronic flash having a small light quantity can be used sufficiently practically. Further, the size of the entire camera can be greatly minimized and the camera is very handy to carry.

The camera of the present invention is handy to carry and is cheap, and when it is used, an appropriate iris opening value can easily be chosen day and night and photographing can be performed very easily night and day. Therefore, it can be said that the camera of the present invention is a camera optimum to amateurs.

What is claimed is:

1. An electronic flash-installed camera, including means for securing a power source therein, in which the shutter speed is fixed and the iris opening is variable, said camera comprising an outer casing, at least one iris opening indicating window formed on the surface of the outer casing, an iris member having an iris hole for controlling the iris opening, weather marks indicating the weather condition by pictures, distance marks indicating by pictures a distance to an object to be photographed, a first means for moving said weather marks and distance marks below said iris opening indicating window and for moving said iris member in correspondence with movement of the weather marks and distance marks to thereby change the iris opening value, a power switch for turning said power source on and off, and an indication change-over device mechanically coupled to said power switch for selectively exposing one of said distance marks or weather marks through said iris opening indicating window in response to on and off switching motions of said power switch.

2. An electronic flash-installed camera as set forth in claim 1 further comprising means for setting the iris opening value to any of F : 4, F : 8 and F : 16 settings by the movement of the iris member caused by the movement of the first means.

3. An electronic flash-installed camera as set forth in claim 2 wherein the weather marks include a fine weather mark indicating by a picture that it is fine and a cloudy weather mark indicating by a picture that it is cloudy and said distance marks include a near distance mark indicating by a picture that the distance to the object to be photographed is small and a far distance mark indicating by a picture that the distance to the object to be photographed is large.

4. An electronic flash-installed camera as set forth in claim 3 comprising means operative when the power switch of the installed electronic flash is in the off position to expose weather marks through the iris opening indicating window so that the fine weather mark is exposed when the iris opening value is adjusted to F : 16 by the movement of the first means and the cloudy mark is exposed when the iris opening value is adjusted to F : 8 by the movement of the first means, and means operative when the power switch is in the on position to expose the distance marks through the iris opening indicating window so that the near distance mark is exposed when the iris opening value is adjusted to F : 8 by the movement of the first means and the far distance mark is exposed when the iris opening value F is adjusted to F : 4 by the movement of the first means.

5. An electronic flash-installed camera including means for securing a power source therein, in which the shutter speed is fixed and the iris opening is variable, said camera comprising an outer casing, at least one iris opening indicating window formed on the surface of the outer casing, an iris member having an iris hole for controlling the iris opening, an indicating board having drawn thereon weather marks indicating the weather condition by pictures and distance marks indicating by pictures a distance to an object to be photographed, a first means for moving said weather marks and distance marks below said iris opening indicating window and moving said iris member in correspondence with movement of the weather marks and distance marks to thereby change the iris opening value, a power switch for turning said power source on and off, and an indication change-over device for sliding said indicating board co-operatively with the switching operation of said power switch so that when the power switch is in the on position, one of the distance marks is exposed through said iris opening indicating window and when the power switch is in the off position, one of the weather marks is exposed through said iris opening indicating window.

6. An electronic flash-installed camera as set forth in claim 5 wherein the weather marks include a fine weather mark indicating by a picture that it is fine and a cloudy weather mark indicating by a picture that it is cloudy and distance marks include a near distance mark indicating by a picture that the distance to the object to be photographed is small and a far distance mark indicating by a picture that the distance to the object to be photographed is large, are disposed adjacent each other on the indicating board.

7. An electronic flash-installed camera including means for securing a power source therein, in which the shutter speed is fixed and the iris opening is variable, said camera comprising an outer casing, one iris opening indicating window formed on the surface of the outer casing, an iris member having an iris hole for controlling the iris opening, a first means for moving the iris member to change the iris open value and having at least a portion thereof disposed below said iris opening indicating window, weather marks indicating the weather condition by a picture, said weather marks being disposed on said portion of the first means below said iris opening indicating window, an indicating board slidably mounted on said weather mark-drawn portion of the first means to cover said portion, distance marks indicating by a picture the distance to an object to be photographed, said distance marks being disposed on the surface of said indicating board, a power switch for turning said power source on and off, and an indication change-over device operatively associated with said power switch so that when the power switch is in the off position, said indicating board is fixed at a position exposing one of the weather marks through the iris opening indicating window and so that when the power switch is in the on position, the indicating board is shifted to cover the weather marks and one of the distance marks is exposed through the iris opening indicating window.

8. An electronic flash-installed camera including means for securing a power source therein, in which the shutter speed is fixed and the iris opening is variable, said camera comprising an outer casing, two iris opening indicating windows formed on the surface of the outer casing, a power switch for turning said power source on and off, an indication change-over device operatively associated with said power switch to cover one of said iris opening indicating windows in synchronizing with the position of the power switch, an iris member having an iris hole for controlling the iris opening, a moving device for moving said iris member to change the iris opening and having at least a portion positioned below said iris opening indicating windows, and weather marks for indicating the weather condition by pictures, and distance marks for indicating by pictures a distance to an object to be photographed, said weather marks and distance marks being disposed on said portion of the moving device below the iris opening indicating windows, said moving device being coupled to the power switch so that when the power switch is in the on position, one of the distance marks is exposed through one of said iris opening indicating windows and when the power switch is in the off position, one of the weather marks is exposed through the other iris opening indicating window.

9. An electronic flash-installed camera as set forth in claim 8 wherein said two iris opening indicating windows are arranged adjacent each other and a partition between the two windows communicate with each other and comprise a single composite window.

* * * * *